May 9, 1967

J. J. SABATINI 3,318,162

STARTER DRIVE

Filed May 27, 1965

WITNESS:
Esther M. Stockton

INVENTOR.
John J. Sabatini
BY
W. S. Thompson
ATTORNEY

3,318,162
STARTER DRIVE
John J. Sabatini, Horseheads, N.Y., assignor to The Bendix Corporation, a corporation of Delaware
Filed May 27, 1965, Ser. No. 459,273
6 Claims. (Cl. 74—6)

The present invention relates to an engine starter drive for an internal combustion engine and more particularly, to a starter drive of the positive-shift type, including therein a dentil clutch adapted to provide power transmission, overrunning and indexing functions.

In prior art developments of drives of this character, reliable indexing function has been a persistently insoluble problem. It is not uncommon to require many energizations of the starter drive to procure any engine cranking. The present invention provides a desirable solution to the indexing problem by preventing relative rotation in an indexing opposing direction between the dentil clutch members during indexing function. The present invention does not interfere with relative rotation of the dentil clutch members during the overrunning function nor does it interfere with normal power transmission function.

These desirable ends are attained by extending a portion of a mesh enforcing or bias spring through a slot in driving clutch to mate with the dentils of the driven clutch to prohibit relative rotation between the driving clutch and the driven clutch during indexing operation. The extending portion of the bias spring is blocked from contact with the driven clutch member during power transmission and overrunning operation of the drive.

It is an object of the present invention to provide starter gearing for internal combustion engines which is simple, efficient, reliable and economical to manufacture and fabricate.

It is another object of the present invention to provide a starter drive having apparatus for insuring proper indexing function and to prevent damage to clutch dentil teeth.

It is a further object of this invention to provide a starter drive having an overrrunning connection which will not drive the starter motor armature shaft.

It is a still further object of the present invention to provide a mesh enforcing spring which, during indexing, is adapted to prevent rotation of the driven clutch member in a non-indexing direction.

It is a still further object of the present invention to reduce energization of the starter motor and thereby prolong its life.

With the above and other objects in view which will appear as the description proceeds, this invention resides in the novel construction, combination and arrangement of parts substantially as hereinafter described.

Figure 2:
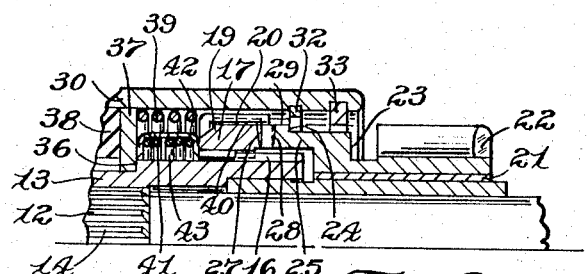
FIGURE 2 is a view of a portion of the device shown in FIGURE 1 showing the clutch members, the mesh-enforcing springs and the spring extension at maximum rearward travel during indexing operation.
Figure 3:
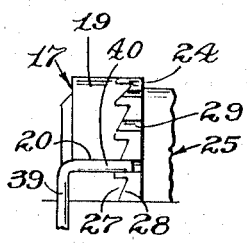
Figure 4:
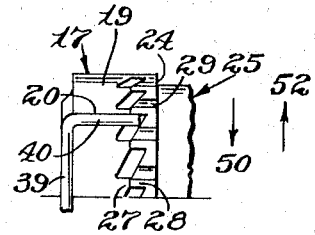

FIGURE 3 is a top view of a portion of the device shown in FIGURE 2 showing portions of the clutch members, clutch slots and spring extension during indexing operation when the driving and driven clutch slots are aligned; and FIGURE 4 is a top view of a portion of the device shown in FIGURE 2 showing portions of the clutch members and spring extension during indexing operation when the driving clutch dentil teeth are substantially in end-to-end abutment.

Figure 1:
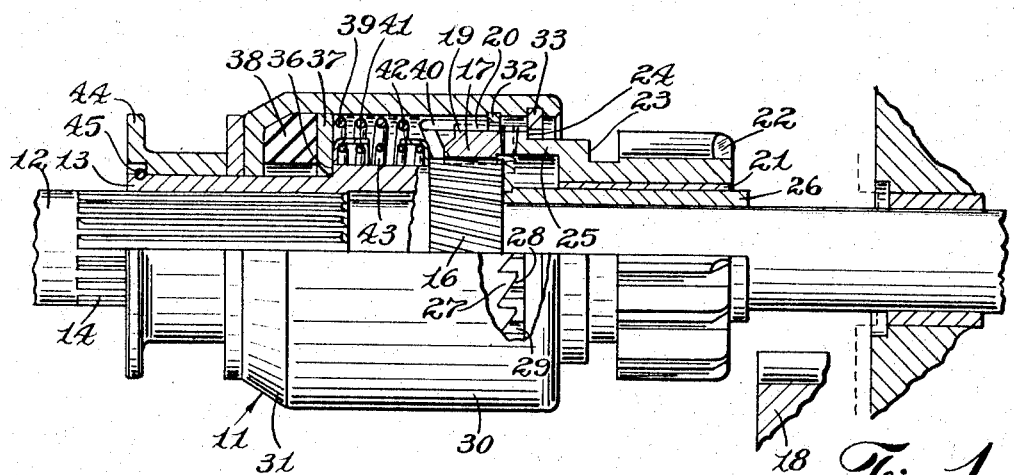
FIGURE 1 is a side elevated view, partly in section and partly broken away, of an embodiment of the present invention showing the drive in an idle position and the spring extension and the clutch slots which may be employed.

Referring now to the drawing wherein like reference characters represent like parts in the four views, in FIGURE 1 there is illustrated a starter drive for an internal combustion engine, generally designated 11 mounted on a power shaft 12 of a starting motor (not shown). The drive includes a sleeve 13 slidably, but non-rotatably, secured to the power shaft by straight splines 14. The external surface of the forward or right-hand extremity of the sleeve has helical splines 16 formed thereon and a driving clutch member 17 is threaded thereon for movements in directions toward and away from a gear 18 of the engine to be started. The driving clutch member is provided with a radially-outwardly-extending flange 19 having an axially-extending slot 20 formed therein.

A pinion 22 has a sleeve bearing 21 slidably journalled to the inner sleeve 26 and supported on the reduced diameter extremity of the power shaft. The pinion is adapted for movement into and out of engagement with the gear 18. The sleeve bearing under the pinion permits the pinion to be moved toward the engine regardless of contamination on the power or armature shaft 12. The inner or left-hand extremity of the pinion is radially offset as at 23 and 24 to provide a driven clutch member 25. The opposing or adjacent faces of the clutch members 17 and 25 are provided with complementing inclined torque transmitting dentil teeth 27 and 28 respectively. The dentil teeth are of the saw-toothed variety to provide a one-way overrunning clutch connection. A plurality of axially-extending slots 29 may be formed in the driven clutch 25 surface adjacent the driving clutch member. The slots 29, if employed, are so formed as to be capable of axial alignment with the slot 20 formed in the driving clutch member 17.

A barrel-shaped housing 30, having a closed and an open end, is slidably supported at its closed end 31 adjacent the rear or left-hand external surface of the sleeve 13. A lock ring 33, seated in a notch in the open end of the housing, has sufficient radial length to engage the pinion offset 24 when the pinion has moved to an extreme right-hand position (as shown in FIGURE 1) relative to the housing to thereby confine the clutch elements within the housing cavity. An annular abutment ring 32, fitted into a notch in the housing 30, is disposed above the driving clutch member 17 when it is in the idle, driving or overrunning position (best illustrated in FIGURE 1). The purpose of the ring will be described shortly.

The sleeve 13 is provided with a radial shoulder 36 intermediate its extremity to provide an abutment for a disc or washer 37 slidably journalled on the sleeve. A resiliently-yieldable cylinder 38, preferably of an elastically-deformable material such as rubber, is compressively confined between the disc and the closed end 31 of the housing. A clutch spring 39 is compressively confined between the disc and the flange 19 to normally bias the driving clutch member into engagement with the driven clutch member. The clutch spring 39 has an axially-extending portion or tang 40 fitted through the slot 20 in the driving clutch member which is capable of engaging any one of the slots 29 or the dentils 28 of the driven clutch to prevent relative rotation between the clutch members (as shown in FIGURES 3 and 4) when the starter drive is in indexing function as will be described in detail later. A pair of cup-like retainer structures 41 and 42 are supported on the sleeve within the convolution of spring 39 and intermediate the helical splines 16 and washer 37. The cups open axially toward each other and a second spring 43 is confined within and between the cups.

Devices for moving the sleeve, housing and associated parts toward and away from the engine gear are well known in the art. Such devices are attached to the shaft collar 44 which is confined on the sleeve by a thrust ring 45. It is understood, as is well known in the art, that the shaft collar 44 combines with other devices (not shown) for controlling the energization of the starting motor.

In operation, when it is desired to start the engine, the collar 44 will be moved toward the gear 18 of the engine to be started, axially urging the housing 30 and its associated parts toward the gear 18. Axial displacement of the housing will be transferred to the sleeve 13 by the compression element 38, disc washer 37 and shoulder 36, and simultaneously, the axial motion will be transferred to the driving clutch member 17 by the spring member 39. Sleeve 13 will be limited to axial movement by its splined connection to the power shaft 12 when the starting motor is not rotating. The driving clutch member is biased into engagement with the driven clutch member 25 of the pinion. The camming action between the clutch dentil teeth will tend to cause full mesh of the dentils. The sleeve bearing 21, since it is secured to the sleeve 13, will move toward the engine gear regardless of the contamination on the armature shaft. The pinion journalled thereon will also move toward the gear 18 without being retarded.

If tooth abutment should occur between the pinion and engine ring gear, the pinion will be moved rearwardly relative to the housing. Such rearward movement presses the clutch dentils 27 and 28 against each other in whatever position they are in. If the clutch dentils are slightly out of full mesh, they will mesh completely and continued rearward movement will cause the driving clutch to move rearwardly against the bias of the spring 39. The axial extension 40, fitted through the slots 20 and 29, will lock the dentils relative to one another (as shown in FIGURE 3) if the slots 29 are used. Since the driving clutch member is supported on helical splines 16, any movement of this clutch member will be accompanied by a rotary as well as an axial movement. This rotary movement will, in turn, be transmitted through the driven clutch member to the pinion to rotate the pinion relative to the engine gear and eliminate tooth abutment.

If tooth abutment should occur when the clutch dentils are substantially end-to-end, the relative rearward movement of the pinion will be transferred to the driven clutch member and driving clutch member. The extension 40, fitted through the slot 20 by engaging one of the dentil teeth 28, will prevent rotation of the driven clutch member 25 in the direction as shown by arrow 50 relative to the driving clutch member 17 (FIGURE 4) which, in the embodiment shown, is a rotation of the driven clutch member and pinion opposing indexing. If the driven clutch member were to rotate in the direction shown by arrow 52, that would be rotational and axial movement (in the embodiment shown) aiding indexing and would not be prevented by the axial extension 40.

Extreme indexing movements of the clutch members will cause the driving clutch member to engage the cup-shaped retainer member 42 and will compress the spring 43. Rearward clutch member movement is effectively limited during indexing or during overrun when the edge portions of the retainers 41 and 42 abut. The retainers also act to confine the spring 43 and prevent its detrimental engagement with the spring 39. When the pinion 22 and the gear are in proper alignment, the spring 39 (and the spring 43) will assert biasing force on the clutch members and pinion, urging them forward to their proper positions relative to the housing. As the forward end of the axial extension 40 reaches the abutment ring 32, the driven clutch member will be disconnected from contact with the extension to permit the driven clutch to overrun without contact with the axial extension 40.

After the device has engaged the engine gear, the starting motor will be energized and cranking torque will be transmitted from the power shaft 12 and splines 14 to the sleeve 13 and through the splines 16 to the clutch members 17 and 25 and thence to the pinion 22 and the engine gear 18. The engine, due to its natural inertia, will initially resist the starting motor torque and deceleration of the starting motor torque will take place. The engine inertia causes the driving clutch member to be threaded on the spline 16 toward the engine gear. Since the driving clutch members are in engagement with each other, this forward movement will be transferred to the housing by the lock ring 33, causing the housing to move forward relative to the sleeve. This transferred deceleration torque is absorbed by the compression element 38. After the engine inertia has been overcome, the stored energy is then restored to the drive. The abutment ring 32 will prevent the axial extension 40 of the spring 39 from engaging a slot 29 of the driven clutch.

When the engine becomes operative, the clutch members will overrun in a normal fashion.

It will be readily apparent to those skilled in the art that the above-described invention attains all the previously-stated objects.

I claim:
1. Starter gearing for an internal combustion engine adapted to be supported on a power shaft comprising:
   a sleeve slidably, but non-rotatably, connected to the power shaft, said sleeve having external splines formed on one extremity;
   a pinion journalled on the power shaft for axial movement into and out of engagement with a gear of an engine to be started;
   a driven clutch member operatively connected to the pinion;
   a driving clutch member threaded on the sleeve splines, said clutch members having complementing inclined torque transmitting teeth adapted to provide an indexing and an overrunning clutch connection;
   a barrel housing having an open end slidably supported adjacent the other extremity of the sleeve and spatially encompassing the clutch members;
   means within the housing adjacent the open end thereof for confining the clutch members within the housing;
means in the housing for normally biasing the clutch members into engagement;
   means in the housing adapted to engage the clutch members to limit relative rotation therebetween upon indexing including an axially-extending member adapted to interconnect the clutch members, preventing substantially all angular displacement opposing indexing between said clutch members when the pinion and the engine gear are in end-to-end abutment; and
   means to prevent the axially-extending member from interconnecting the clutch members during overrunning clutch connections,

2. Starting apparatus of the type set forth in claim 1 wherein:
   the means for biasing the clutch member into engagement includes elastic means adapted to utilize the deceleration torque of the starting motor at the initiation of the cranking operation and spring means;
   the driving clutch member includes an axially-extending slot; and
   the means for engaging both clutch members includes an axially-extending portion of said spring means.

3. Starting apparatus for an internal combustion engine comprising in combination:
   a starting motor having a power shaft;
   a sleeve having a straight splined connection to the shaft, said sleeve adapted to be axially, but non-rotatably, moveable relative to the power shaft;
   helical splines formed on one extremity of the sleeve;
   a pinion journalled on the power shaft for axial movement into and out of engagement with the gear of the engine to be started;

a driving clutch member having an axially-extending slot formed therethrough;
a driven clutch member;
said clutch members including complementing inclined torque transmitting teeth adapted to provide an overrunning connection;
a barrel housing including an open and a closed end slidably supported at the closed end adjacent the other extremity of the sleeve, said housing spatially encompassing the clutch members;
a lock ring in the housing adjacent the open end thereof adapted for engagement with the driven clutch member for confining the clutch members within the housing;
spring means compressively confined between the housing and the clutch members for normally biasing the clutch members to operative positions;
said spring means having axially-etxending means fitted through the slot of the driving clutch member adatped to engage the teeth of the driven clutch member for limiting relative rotation between the driving clutch and the driven clutch members during end-to-end abutment of the pinion with the gear of the engine to be starter; and
means for actuating the housing and sleeve toward and away from the engine gear.

4. Starting apparatus of the type set forth in claim 3 wherein the spring means for biasing the clutch members comprises:
a coil spring member compressively confined between the closed end of said housing and the driving clutch member having an axially-extending portion fitted through the slot of the driving clutch member adapted to engage the teeth of the driven clutch member for limiting relative rotation between the driving clutch member and the driven clutch member during engagement of the pinion with the gear of the engine to be started.

5. The device described in claim 4 including further:
abutment means for preventing the axially-extending portion of the spring means from limiting the rotation of the driven clutch member relative to the driving clutch member when the pinion and the engine gear are engaged.

6. The device described in claim 4 including further:
an annular abutment member in the housing radially outwardly of said clutch members for engaging the axially-extending portion of the first spring member.

References Cited by the Examiner
UNITED STATES PATENTS 3,181,374  5/1965  Sabatini _____ 74—6

MILTON KAUFMAN, *Primary Examiner.*